United States Patent
Machita et al.

(10) Patent No.: US 8,310,791 B2
(45) Date of Patent: Nov. 13, 2012

(54) MAGNETORESISTIVE EFFECT ELEMENT AND MAGNETIC DISK DEVICE

(75) Inventors: Takahiko Machita, Tokyo (JP); Tomohito Mizuno, Tokyo (JP); Koji Shimazawa, Tokyo (JP); Tsutomu Chou, Tokyo (JP); Daisuke Miyauchi, Tokyo (JP); Yoshihiro Tsuchiya, Tokyo (JP); Shinji Hara, Tokyo (JP); Toshiyuki Ayukawa, Tokyo (JP)

(73) Assignee: TDK Corporation, Tokyo (JP)

( * ) Notice: Subject to any disclaimer, the term of this patent is extended or adjusted under 35 U.S.C. 154(b) by 915 days.

(21) Appl. No.: 12/382,309

(22) Filed: Mar. 13, 2009

(65) Prior Publication Data

US 2010/0232074 A1 Sep. 16, 2010

(51) Int. Cl.
*G11B 5/39* (2006.01)

(52) U.S. Cl. ............... 360/324.11; 360/319; 360/324.12

(58) Field of Classification Search .................. None
See application file for complete search history.

(56) References Cited

U.S. PATENT DOCUMENTS

| | | | |
|---|---|---|---|
| 6,169,647 B1 * | 1/2001 | Mao et al. | 360/324.11 |
| 6,358,635 B1 | 3/2002 | Min et al. | |
| 6,447,935 B1 * | 9/2002 | Zhang et al. | 428/810 |
| 6,710,984 B1 * | 3/2004 | Yuasa et al. | 360/324.11 |
| 6,724,583 B2 | 4/2004 | Siegler et al. | |
| 7,742,262 B2 * | 6/2010 | Fukuzawa et al. | 360/324.12 |
| 2005/0264953 A1 * | 12/2005 | Oshima et al. | 360/324.11 |
| 2007/0064350 A1 * | 3/2007 | Gill | 360/324.2 |

FOREIGN PATENT DOCUMENTS

JP A-09-274712 10/1997

* cited by examiner

*Primary Examiner* — Kevin Bernatz
(74) *Attorney, Agent, or Firm* — Posz Law Group, PLC

(57) ABSTRACT

A magnetoresistive effect element is structured in the manner that the antiferromagnetic layer interposed between the upper and lower shields is eliminated and the antiferromagnetic layer is positioned in a so-called shield layer. Therefore, it is realized to solve a pin reversal problem and to allow narrower tracks and narrower read gaps.

12 Claims, 8 Drawing Sheets

MAGNETORESISTIVE EFFECT ELEMENT AND MAGNETIC DISK DEVICE

BACKGROUND OF THE INVENTION

1. Technical Field of the Invention

The present invention relates to a magnetoresistive effect element for reading the magnetic field intensity of a magnetic recording medium etc. as signals, a thin film magnetic head comprising the element, and a head gimbal assembly and magnetic disk device including the thin film magnetic head.

2. Description of the Related Art

As the surface recording density of a magnetic disk device has lately been increasing, there is a need for enhancing a performance of a thin film magnetic head. As a thin film magnetic head, a complex type thin film magnetic head has widely been used that has a laminated structure of a reproducing head having a read-only magnetoresistive effect element (hereafter also referred to as an MR element) and a recording head having a write-only induction type magnetism conversion element.

Examples of the MR element include anisotropic magnetoresistive effect (AMR) elements utilizing an anisotropic magnetoresistive effect, giant magnetoresistive effect (GMR) elements utilizing a giant magnetoresistive effect, and tunnel type magneto resistive effect (TMR) elements utilizing a tunnel type magneto resistive effect.

The reproducing head is particularly required to be highly sensitive and yield high output. As reproducing heads satisfying such requirements, GMR heads using the spin valve type GMR element have already been in mass production. Recently, the reproducing head using the TMR element has also been in mass production in accordance with further increased surface recording densities.

The spin valve type GMR element generally has a nonmagnetic intermediate layer, a free layer formed on one surface of the nonmagnetic intermediate layer, a magnetic pinned layer formed on the other surface of the nonmagnetic intermediate layer, and a pinning layer (generally an antiferromagnetic layer) formed in contact with the magnetic pinned layer on the opposite side thereof to the nonmagnetic intermediate layer. The free layer is a layer of which the magnetization direction changes in accordance with the signal magnetic field from an external source. The magnetic pinned layer is a layer of which the magnetization direction is pinned by the exchange-coupling magnetic field from the pinning layer (antiferromagnetic layer).

The majority of traditional GMR heads have a CIP-GMR element having the CIP (current in plane) structure in which the magnetic signal detection current (so-called sense current) is applied in parallel to the planes of the layers composing the GMR element, and such an element has been in mass production.

On the other hand, a GMR element having the CPP (current perpendicular to plane) structure (the CPP-GMR element) in which the sense current is applied perpendicular to the planes of the layers composing the GMR element (in the lamination direction) has been developed as a next generation element, and an attempt has been made to mass produce the TMR element, which is a type of CPP-GMR element.

The TMR element generally has a free layer, a magnetic pinned layer, a tunnel barrier layer (nonmagnetic intermediate layer) interposed between them, and an antiferromagnetic layer provided on the opposite surface of the magnetic pinned layer to the surface in contact with the tunnel barrier layer. The tunnel barrier layer is a nonmagnetic insulating layer that allows electrons to pass through with their spin maintained by the tunnel effect. Other layers such as the free, magnetic pinned, and antiferromagnetic layers are basically the same as those used in the spin valve type GMR element.

Both the TMR element, which is now in mass production, and the CPP-GMR element, which is under development, must have narrower tracks and read gaps for realizing further increased recording densities.

The typical spin valve type CPP-GMR element including aforementioned TMR element is structured as a laminated body primarily consisting, from the bottom in consideration of the lamination order, of a lower electrode, an antiferromagnetic layer, a first ferromagnetic layer (magnetic pinned layer), a nonmagnetic intermediate layer, a second ferromagnetic layer (free layer), and an upper electrode. The magnetization direction of the first magnetic layer, which is one of the ferromagnetic layers, is pinned perpendicularly to the magnetization direction of the second ferromagnetic layer when the externally applied magnetic field is zero. The magnetization direction of the first ferromagnetic layer can be pinned by placing an antiferromagnetic layer next to the first ferromagnetic layer so as to cause exchange-coupling, by which unidirectional anisotropic energy (also referred to as exchange bias or coupled magnetic field) is provided to the first ferromagnetic layer. Therefore, the first ferromagnetic layer is also called a magnetic pinned layer, as referred to above, or a pinned layer. Such an element has a larger resistance value and is subject to larger fluctuation in resistance as it has a smaller cross-sectional area. In other words, the element has a structure suitable for reduced track width or narrower tracks.

The thin film magnetic head having the above spin valve type CPP-GMR element is provided with bias magnetic field application layers on two sides of an MR element. The bias magnetic field application layers apply a so-called vertical bias to the element. Consequently, the second ferromagnetic layer serving as a free layer has a single domain, preventing occurrence of noise and allowing for detection of a specific external magnetic field.

However, the traditional magnetoresistive effect element has an antiferromagnetic layer within the region serving as an MR sensor as understood from the above described MR laminated film structure. There is the problem that, as the tracks narrow, the probability of pin reversal of the magnetic pinned layer (hereafter simply termed "pin reversal") is increased. This results from the grain size of the antiferromagnetic layer being non-negligibly small in relation to the track width. The antiferromagnetic layer generally has a grain size of approximately 20 nm. The track width required in the next generation recording density class of 500 Gbpsi is approximately 50 nm. Then, the number of grains in the antiferromagnetic layer in the track width direction is anticipated to be 2 to 3 (50 nm divided by 20 nm).

In this way, reduction in the number of grains composing the antiferromagnetic layer causes weakened exchange-coupling between the antiferromagnetic layer and first ferromagnetic layer and variation in magnetic properties. Therefore, the pin reversal problem may easily occur during so-called wafer process and lapping process. The pin reversal problem presumably becomes a more serious problem as recording density is further increased.

Furthermore, since the antiferromagnetic layer is provided in the region serving as the MR sensor, it is difficult to comply with demand for the narrower read gaps (reduced distance between upper and lower shield layers) required for higher recording densities.

In the above circumstances, the invention of the present application is proposed, the purpose of which invention is to provide a magnetoresistive effect element in which the antiferromagnetic layer provided between the upper and lower shields is eliminated and the antiferromagnetic layer is provided in a so-called shield layer so as to resolve the above pin reversal problem and allow for much narrower read gaps.

SUMMARY OF THE INVENTION

In order to solve the above drawbacks, the present invention is a magnetoresistive effect (MR) element of a current perpendicular to plane (CPP) structure including: a magnetoresistive effect (MR) part that includes a multilayer film formed of sequentially a magnetic pinned layer, a nonmagnetic intermediate layer, and a free layer; bias magnetic field application layers formed on either end of the multilayer film in the width direction; and first and second shield layers provided so as to interpose the MR part between them from above and below, wherein a sense current is applied in the lamination direction, characterized in that: the free layer is configured to change its magnetization direction in accordance with the external magnetic field; the bias magnetic field application layers are configured to apply a vertical bias magnetic field in a width direction to the free layer and to extend backwardly from an air bearing surface (ABS) that is the medium opposed surface; the first shield layer is provided closer to the magnetic pinned layer than to the free layer, and has a laminated structure comprising of, from the magnetic pinned layer side, an oblique pinned layer, an antiferromagnetic layer, and a main shield layer; a magnetic coupling adjustment layer is interposed between the oblique pinned layer of the first shield layer and the magnetic pinned layer; a magnetization of the oblique pinned layer is pinned by an exchange-coupling with the antiferromagnetic layer at an angle of 30 to 60 degrees measured on an acute angle basis with respect to a width direction axis (X-axis) as the reference (0 degree) in a plane defined by the width direction axis (X-axis) and a longitudinal direction axis (Y-axis) of the ABS; the magnetization of the oblique pinned layer is magnetically linked up to a magnetization of the magnetic pinned layer via the magnetic coupling adjustment layer; and the magnetization direction of the oblique pinned layer is magnetically coupled in the magnetic coupling adjustment layer that is from the oblique pinned layer to the magnetic pinned layer so that the magnetization direction is gradually oriented toward the longitudinal direction axis (Y-axis) by the influence of the vertical bias magnetic field in the width direction from the bias magnetic field application layers.

Further, a preferred embodiment of the invention is the MR element including: the magnetic coupling adjustment layer contains a laminated structure comprising an exchange-coupling transmitting layer composed of at least one material selected from a group consisting of Ru, Rh, Ir, Cr, Cu, Ag, Au, Pt, and Pd, and a gap adjustment magnetic layer composed of a ferromagnetic body, and the magnetization direction of the oblique pinned layer is magnetically coupled in the magnetic coupling adjustment layer that is from the oblique pinned layer to the magnetic pinned layer so that the magnetization direction of the oblique pinned layer is gradually oriented toward the longitudinal direction axis (Y-axis) by the assistance of the vertical bias magnetic field in the width direction from the bias magnetic field application layers.

Further, a preferred embodiment of the invention is the MR element wherein the magnetization of the magnetic pinned layer is pinned at an angle of 90±10 degrees with respect to the width direction axis (X-axis) as the reference (0 degree) in a plane defined by the width direction axis (X-axis) and longitudinal direction axis (Y-axis) of the ABS.

Further, a preferred embodiment of the invention is the MR element wherein a direction of the vertical bias magnetic field in the width direction from the bias magnetic field application layers is determined so that the magnetization of the oblique pinned layer is oriented in the 90-degree direction.

Further, a preferred embodiment of the invention is the MR element, wherein the magnetic coupling adjustment layer has a laminated structure formed by alternately laminating the exchange-coupling transmitting layer multiple times, and the gap adjustment magnetic layer and the multiple exchange-coupling transmitting layers have different exchange-coupling forces.

Further, a preferred embodiment of the invention is the MR element, wherein the magnetic coupling adjustment layer has a laminated structure formed by alternately laminating the exchange-coupling transmitting layer and the gap adjustment magnetic layer multiple times, and an exchange-coupling force in each of the multiple exchange-coupling transmitting layers is sequentially increased in an order from the oblique pinned layer to the magnetic pinned layer.

Further, a preferred embodiment of the invention is the MR element, wherein at least one of the exchange-coupling transmitting layers is a double-layer laminated body composed of a Ru layer and a Cu layer, and an exchange-coupling force of the exchange-coupling transmitting layer is adjustable in correspondence with a thickness of the Cu layer.

A thin film magnetic head of the present invention includes: an air bearing surface that faces a recording medium; and the MR element provided near the ABS to detect a signal magnetic field from the recording medium.

A head gimbal assemble of the present invention includes: a slider containing the thin film magnetic head and so provided as to face a recording medium; and a suspension elastically supporting the slider.

A magnetic disk device of the present invention includes: a slider containing the thin film magnetic head and so provided as to face a recording medium; and a positioning device supporting and positioning the slider in relation to the recording medium.

DETAILED EXPLANATION OF THE INVENTION

The best mode for implementing the present invention will be described in detail hereafter.

Figure 1:
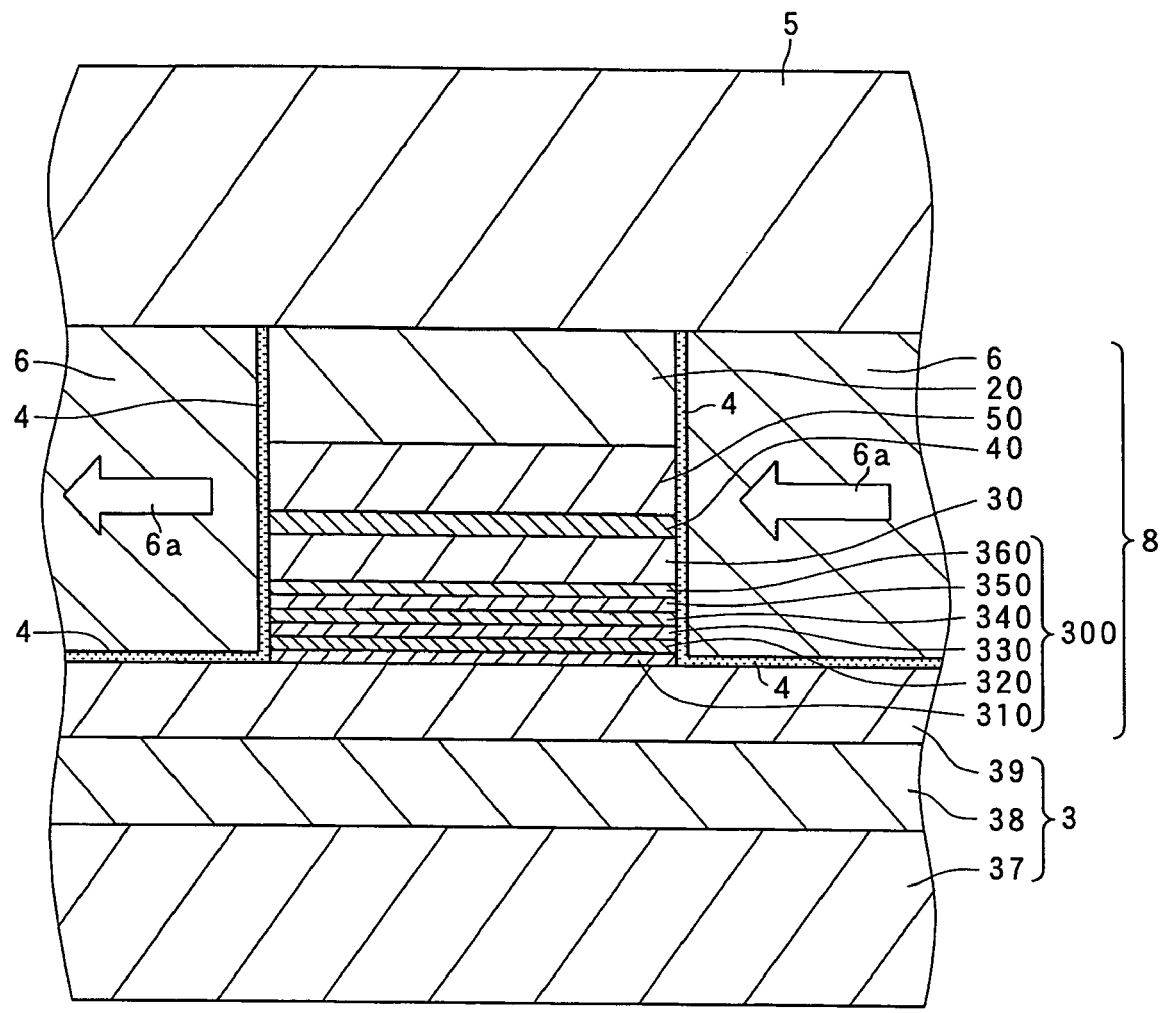
FIG. 1 is a cross-sectional view of a reproducing head including an MR element as a primary element according to an embodiment of the present invention in a plane parallel to the medium opposed surface and seen from the so-called ABS side.

FIG. 1 is a cross-sectional view of a reproducing head containing as a primary element an MR element according to an embodiment of the present invention in a plane parallel to the medium opposed surface and seen from the so-called ABS (air bearing surface) side.

The ABS is the surface of a reproducing head that faces the recording medium (also termed "the medium opposed surface"). The ABS referred to in the present invention contains up to a cross-section at a position where a laminated structure of the element can clearly be observed and, for example, a passivation layer (passivation layer covering the element) that is provided on the medium opposed surface in a strict sense, such as diamond-like carbon (DLC), can be omitted where necessary.

Figure 2:
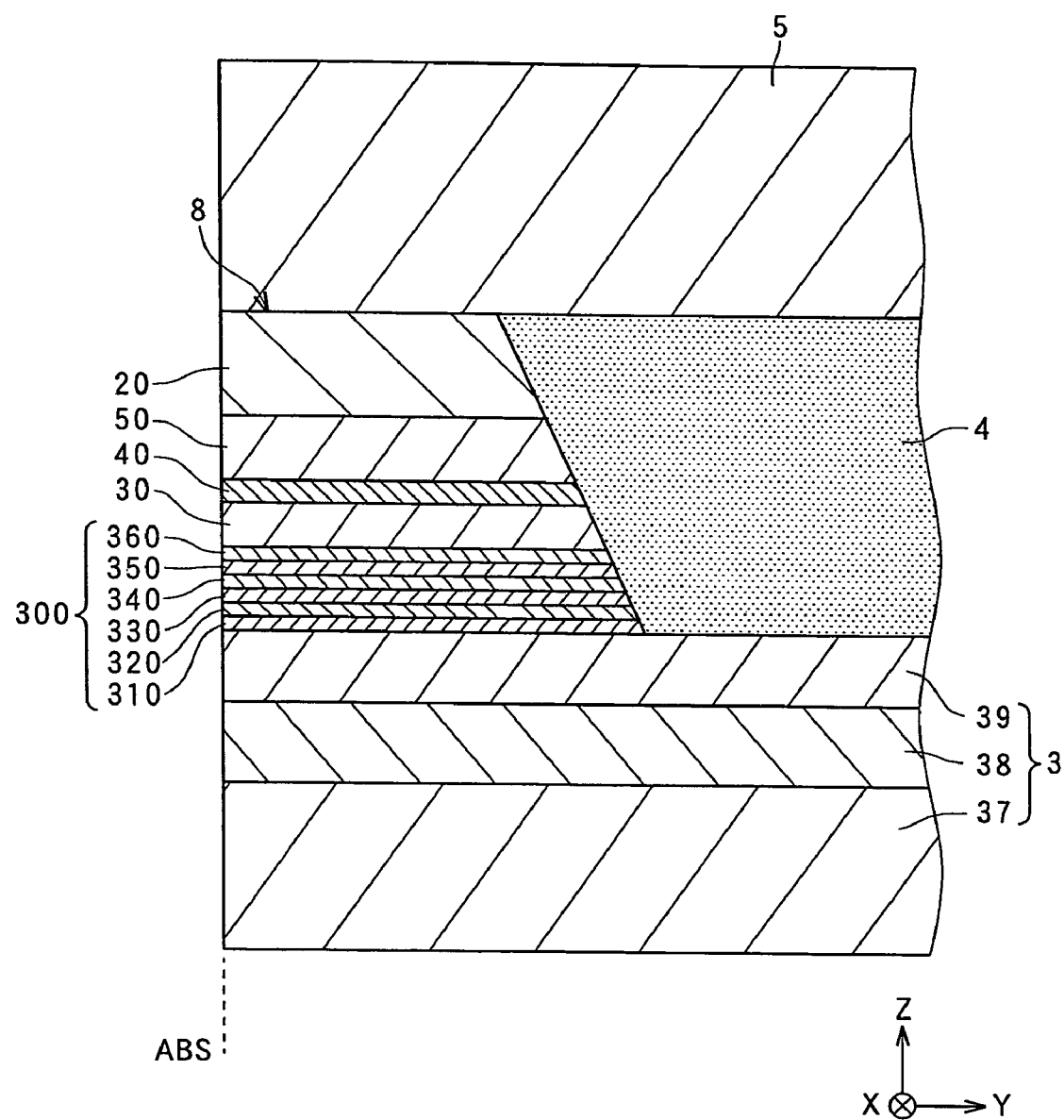
FIG. 2 is an illustration schematically showing a vertical cross-section of FIG. 1.
Figure 3:
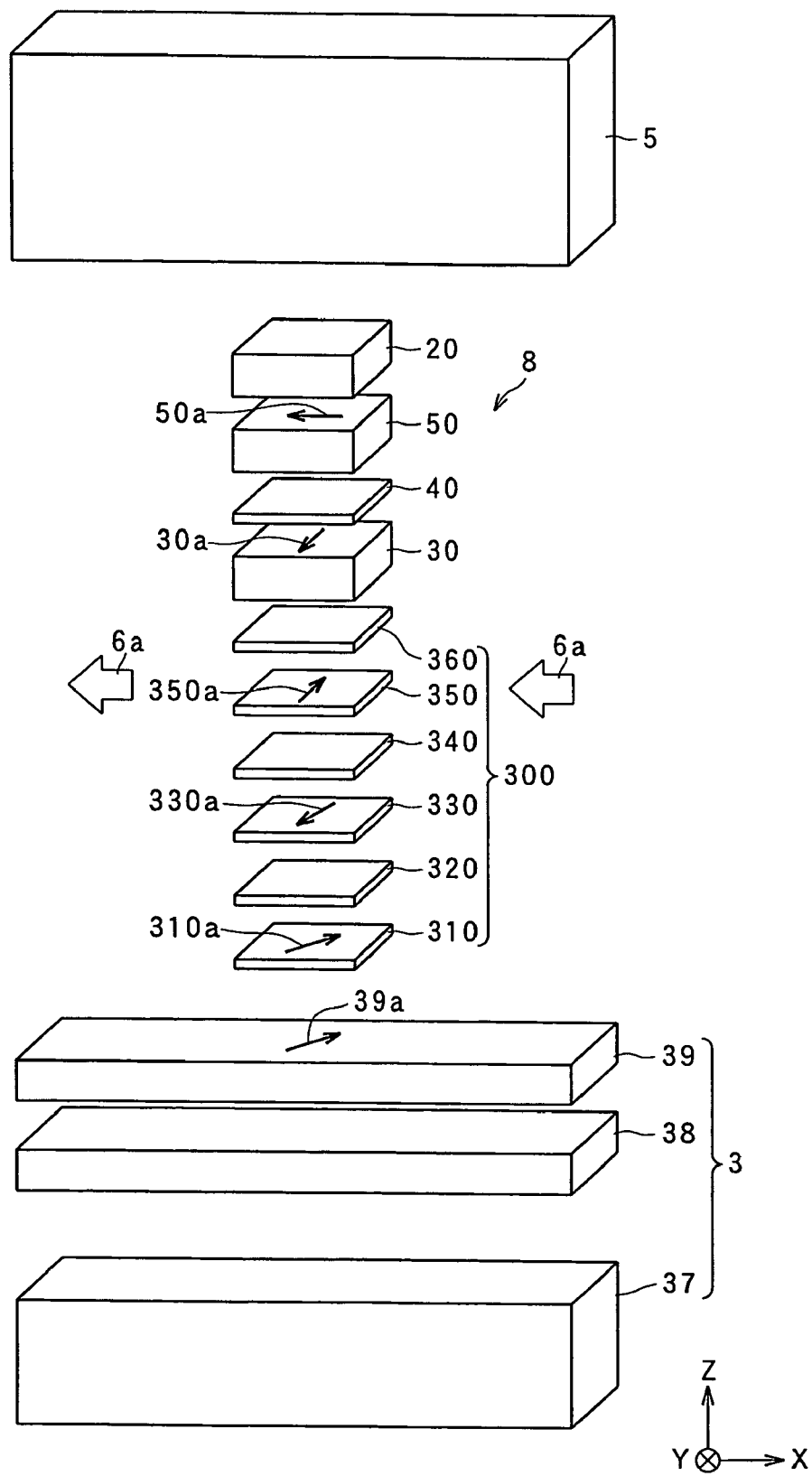
FIG. 3 is an exploded perspective view of the primary members for clearly explaining the structure in FIG. 1.
Figure 4:
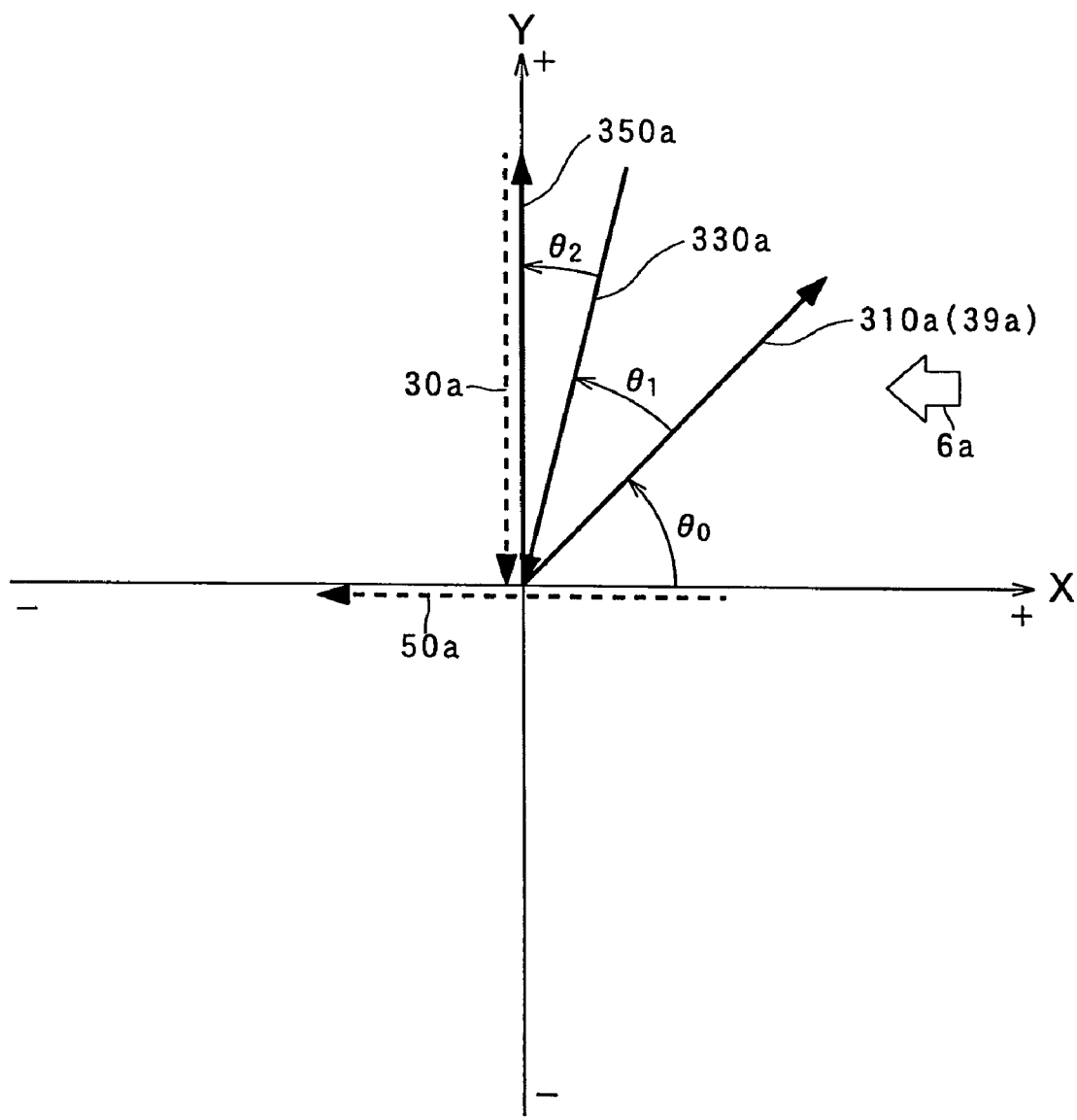
FIG. 4 is a graphic representation of an area from an oblique pinned layer until a magnetic coupling adjustment layer for explaining how the magnetization direction of the oblique pinned layer is gradually oriented toward the longitudinal direction axis (Y-axis) by the assistance of the width direction vertical bias magnetic field from the bias magnetic field application layer.

FIG. 2 is an illustration schematically showing a vertical cross-section of FIG. 1. FIG. 3 is an exploded perspective view of the primary members for clearly explaining the structure in FIG. 1. FIG. 4 is a graphical representation of an area from an oblique pinned layer until a magnetic coupling adjustment layer for explaining how the magnetization direction of the oblique pinned layer is gradually oriented toward the longitudinal direction axis (Y-axis) by the assistance of the width direction vertical bias magnetic field from the bias magnetic field application layer.

In the following explanation of the present invention, dimensions in the X-axis, Y-axis, and Z-axis directions in the drawings are respectively referred to as "width," "length," and "thickness". In the Y-axis direction, the direction toward the ABS (the surface of the thin film magnetic head that faces the recording medium) is referred to as "front" and the opposite direction (the direction to the back) is referred to as "rear." Furthermore, a direction in which the laminated film is built up is referred to as "upper" or "top" and the opposite direction is referred to as "lower" or "bottom."

[Explanation of Reproducing Head Having MR Element]

The MR element of the present invention and the structure of a reproducing head (thin film magnetic head) containing the element as the primary part is described in detail hereafter with reference to FIGS. 1 to 4.

Examples of an MR element include AMR elements utilizing the anisotropic magnetoresistive effect, GMR elements utilizing the giant magnetoresistive effect, and TMR elements utilizing the tunnel type magnetoresistive effect.

In this embodiment, a GMR element having the CPP (current perpendicular to plane) structure (CPP-GMR element) in which a sense current is applied perpendicular to the planes of the layers composing the element will be described as a preferred embodiment of the MR element.

The CPP-GMR element of this embodiment has a first shield layer 3 (also occasionally termed "lower shield layer 3") and a second shield layer 5 (also occasionally termed "upper shield layer 5") provided at the top and bottom in the figure, respectively, at a predetermined distance as shown in FIG. 1, and a magnetoresistive effect part (MR part) 8 interposed between the first and second shield layers 3 and 5.

Furthermore, in FIG. 1, an insulating film 4 is formed to cover the two sides of the MR part 8 in the width direction (the X-axis direction) and a part of the top surface of the first shield layer 3 along the two sides. Bias magnetic field application layers 6 are formed on both sides of the MR part 8 via the insulating film 4. The bias magnetic field application layers 6 are provided so that the ferromagnetic layer serving as a so-called free layer has a single domain, preventing occurrence of noise.

The first and second shield layers 3 and 5 of this embodiment serve as a so-called magnetic shield and as a pair of electrodes. In other words, in addition to magnetic shielding, they serve as a pair of electrodes for creating a sense current in the MR part 8 in the direction intersecting with the planes of the layers composing the MR part 8 or in the direction perpendicular to the planes of the layers composing the MR part 8 (the lamination direction).

Apart from the first and second shield layers 3 and 5, a pair of electrodes can be separately provided above and below the MR part 8.

The MR part 8 of the reproducing head (magnetoresistive effect element) shown in FIGS. 1 and 2 is structured as a multilayer film in which a magnetic coupling adjustment layer 300 formed on the first shield layer 3, a magnetic pinned layer 30 formed on the magnetic coupling adjustment layer 300, a nonmagnetic intermediate layer 40 formed on the magnetic pinned layer 30, a free layer 50 formed on the nonmagnetic intermediate layer 40, and a cap layer 20 formed on the free layer 50 (passivation layer 20) are sequentially laminated in a preferred embodiment.

The MR part 8 consisting of the above multilayer film is interposed between the first and second shield layers 3 and 5. With a voltage being applied between the first and second shield layers 3 and 5, a sense current flows through the thickness of the multilayer film.

[Explanation of MR Part 8]

Free Layer 50 and Cap Layer 20

Free layer 50 is a layer of which the magnetization direction is changed in accordance with an external magnetic field or the signal magnetic field from a recording medium and consists of a low coercivity ferromagnetic layer (soft magnetic layer). The free layer 50 has a thickness of, for example, approximately 2 to 10 nm.

The free layer 50 can be a monolayer film or a multilayer film containing multiple laminated ferromagnetic layers. Preferable ferromagnetic materials include, for example, CoFe, CoFeB, and NiFe.

When the external magnetic field is zero (in the so-called initial state before any external magnetic field is detected), the magnetization direction of the free layer 5 is oriented in the width direction (the direction −X) because of the magnetic field applied by the bias magnetic field application layers 6 formed on both sides of the MR part 8 (the arrows 6a in FIG. 1), and the free layer 5 has a single domain so that Barkhausen noise does not occur.

The cap layer 20 (passivation layer 20) consisting of, for example, a Ta, Ru, or Cr layer is formed on the free layer 50 as shown in FIG. 1. The cap layer 20 has a thickness of approximately 0.5 to 20 nm.

The cap layer 20 functions not only as a passivation layer for the sensor but also as a gap adjustment layer for positioning the free layer 50 in a center of the laminated film.

Magnetic Pinned Layer 30

The magnetic pinned layer 30 is a magnetic layer of which the magnetization direction is pinned (a so-called pinned layer). On the other hand, the above described free layer 50 is a layer of which the magnetization direction changes in correspondence with an external magnetic field.

Therefore, when the magnetization directions of the magnetic pinned layer 30 and free layer 50 are perpendicular to each other in the initial state, the relative angle between the magnetization directions of the magnetic pinned layer 30 and free layer 50 changes as the magnetization direction of the free layer 50 changes by an external magnetic field, causing a change in resistance. The change in resistance is detected by means of the sense current through the laminated film, detecting magnetic information from the medium.

The magnetization direction of the magnetic pinned layer 30 is pinned in the Y-axis direction in FIG. 1, either from back to front or from front to back of the sheet. In other words, it can be either in the plus Y-axis direction or in the minus Y-axis direction. More specifically, the magnetization of the magnetic pinned layer 30 is pinned at an angle of 90±10 degrees with respect to the width direction axis (X-axis) as the reference (0 degree) in a plane defined by the width direction axis (X-axis) and longitudinal direction axis (Y-axis) of the ABS.

The structure of the first shield layer 3 and the effect of the magnetic coupling adjustment layer 300 interposed between the first shield layer 3 and magnetic pinned layer 30 are important in pinning the magnetization of the magnetic pinned layer 30. The magnetic field applied by the bias magnetic field application layers 6 is also involved. These matters will further be described in detail as the primary part of the invention.

The magnetic pinned layer 30 can be a monolayer film or a laminated film. Preferable ferromagnetic materials include, for example, CoFe, CoFeB, and NiFe.

A case in which the magnetic pinned layer 30 is a laminated film will be described by way of example. The magnetic pinned layer is structured by sequentially laminating an outer layer, a nonmagnetic layer, and an inner layer, forming a so-called synthetic pinned layer.

The outer and inner layers are made of, for example, a ferromagnetic material containing Co and/or Fe. The outer and inner layers are antiferromagnetic-coupled and their magnetization directions are pinned in opposite directions to each other.

It is preferable that the outer and inner layers each consist of, for example, a CoFe alloy layer. Preferably, the outer layer has a thickness of approximately 3 to 7 nm and the inner layer has a thickness of approximately 3 to 10 nm. The nonmagnetic layer is made of, for example, a nonmagnetic material containing at least one selected from the group consisting of Ru, Rh, Ir, Re, Cr, Zr, and Cu. The nonmagnetic layer has a thickness of, for example, approximately 0.35 to 1.0 nm. The nonmagnetic layer is provided to pin the magnetization of the inner and outer layers in opposite directions to each other.

Explanation of Nonmagnetic Intermediate Layer 40

The nonmagnetic intermediate layer 40 is a layer interposed between the magnetic pinned layer 30 and free layer 50 and has a thickness of, for example, approximately 1 to 4 nm.

The nonmagnetic intermediate layer 40 is made of, for example, a nonmagnetic conductive material containing 80% by weight or more of at least one selected from the group consisting of Cu, Au, and Ag.

The nonmagnetic intermediate layer 40 can be a three-layer laminated body formed by sequentially laminating, from the bottom in consideration of laminating order, a first nonmagnetic metal layer, a semiconductor oxide layer, and a second nonmagnetic metal layer. In such a case, the first and second nonmagnetic metal layers can be made of at least one nonmagnetic metal material selected from Cu, Zn, Au, Ag, AuCu, CuZn, Cr, Ru, Rh, and Pt. The semiconductor oxide layer can be made of, for example, zinc oxide (ZnO), indium oxide ($In_2O_3$), or indium tin oxide (ITO).

In the case of a TMR element, the nonmagnetic intermediate layer 40 can be made of oxide or nitride of Al, Ni, Gd, Mg, Ta, Mo, Ti, W, Hf, or Zr.

Explanation of Magnetic Coupling Adjustment Layer 300 and First Shield Layer 3

Since the magnetic coupling adjustment layer 300 is closely related to a structure of the first shield layer 3 as described above, the magnetic coupling adjustment layer 300 and first shield layer 3 will be described together hereafter.

First, the structure of the first shield layer 3 will be described for ease understanding of the invention.

The first shield layer 3 is disposed closer to the magnetic pinned layer 30 than to the free layer 50. Namely, the layer 3 is provided at a lower part (also referred to as "the lower shield layer 3").

The first shield layer 3 has a laminated structure consisting of, from the top, which is close to the magnetic pinned layer 30, to the bottom, an oblique pinned layer 39, an antiferromagnetic layer 38, and a main shield layer 37.

The oblique pinned layer 39 and main shield layer 37 are made of a soft magnetic material, such as NiFe or CoFe, having a high magnetic permeability and high magnetic shield capability. The oblique pinned layer 39 has a thickness of approximately 3 to 30 nm and the main shield layer 37 has a thickness of approximately 0.5 to 2.0 μm (500 to 2,000 nm).

The oblique pinned layer 39 can be a pinned layer using a synthetic-coupling, the pinned layer composed with a ferromagnetic/nonmagnetic/ferromagnetic three-layer laminated body.

Antiferromagnetic Layer 38

The antiferromagnetic layer 38 is formed to fix a magnetization of the oblique pinned layer 39. The antiferromagnetic layer 38 is made of an antiferromagnetic material at least containing one element M' and Mn. Herein, the element M' is selected from a group, for example, consisting of Pt, Ru, Rh, Pd, Ni, Cu, Ir, Cr, and Fe. The Mn content is preferably 35 to 95% by atomic weight. The antiferromagnetic materials are categorized in two types:

(1) non-heat treatment type antiferromagnetic materials that exhibit antiferromagnetism without heat treatment and induce an exchange-coupled magnetic field between itself and a ferromagnetic material; and (2) heat treatment type antiferromagnetic materials that exhibit antiferromagnetism with heat treatment.

Either type, (1) or (2), can be used in the present invention. Examples of the non-heat treatment type antiferromagnetic material include RuRhMn, FeMn, and IrMn. Examples of the heat treatment type antiferromagnetic material include PtMn, NiMn, and PtRhMn.

The antiferromagnetic layer 38 has a thickness of approximately 4 to 30 nm.

Oblique Pinned Layer 39

As a result of exchange-coupling with the antiferromagnetic layer 38, the oblique pinned layer 39 is given unidirectional anisotropic energy and its magnetization is pinned in a specific direction of the present application. The unidirectional anisotropic energy can be given, for example, by annealing in a magnetic field.

Figure 5:
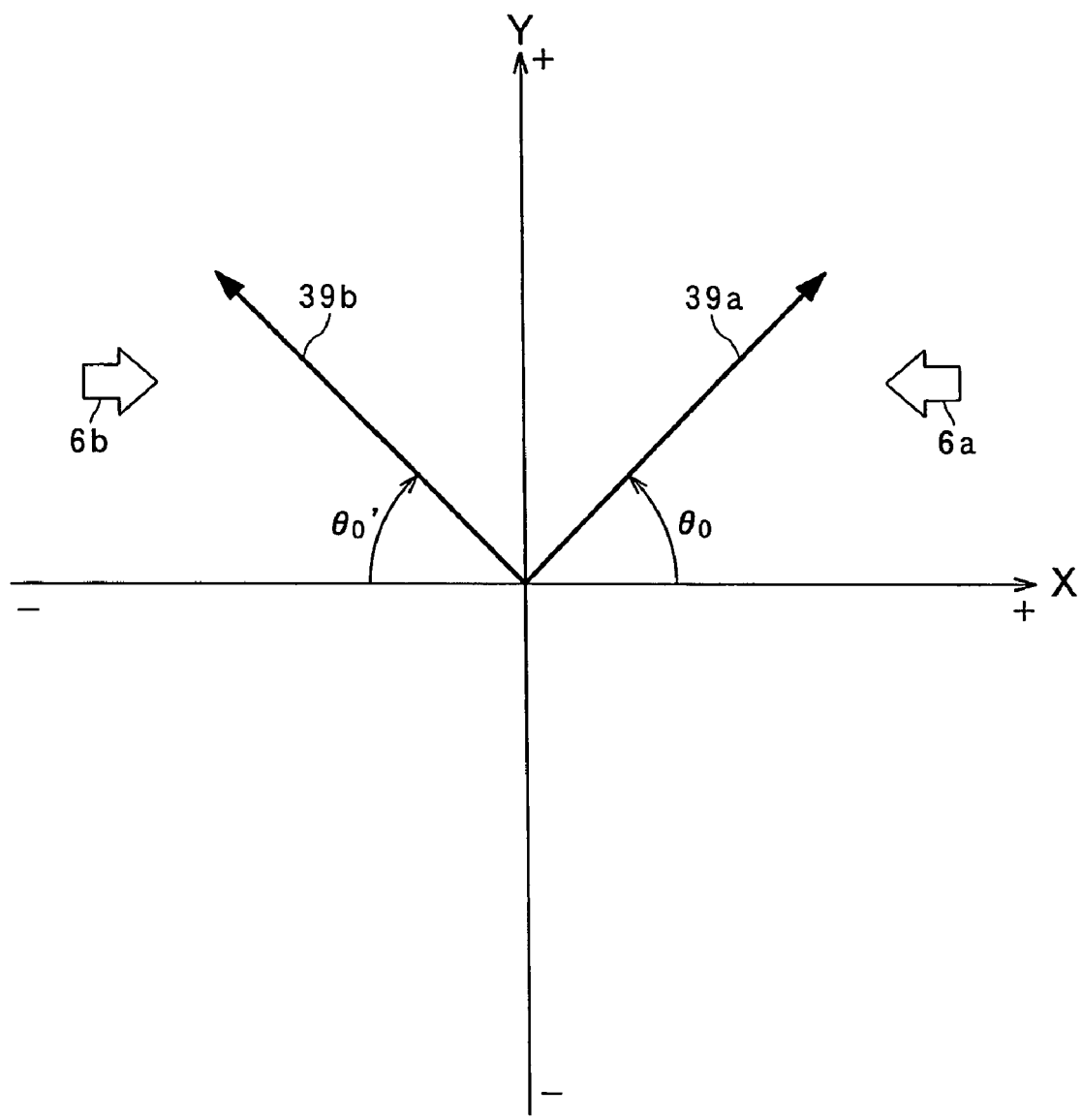
FIG. 5 is a graphic representation for explaining the definition of "measurement on the acute angle basis" using the width direction axis (X-axis) as the reference (0 degree) in a plane defined by the width direction axis (X-axis) and longitudinal direction axis (Y-axis) of the ABS.

As a result of exchange-coupling with the antiferromagnetic layer 38, the magnetization 39a of the oblique pinned layer 39 is pinned at an angle $\theta_0 = 30$ to 60 degrees (preferably 40 to 50 degrees) measured on an acute angle basis with respect to the width direction axis (X-axis) as the reference (0 degree) in a plane defined by the width direction axis (X-axis) and longitudinal direction axis (Y-axis) of the ABS as shown in FIG. 5.

In the four quadrants defined by the X-axis and Y-axis shown in FIG. 5, when the magnetization 39a of the oblique pinned layer 39 is present in the first quadrant where X and Y are positive, the bias magnetic field applied by the bias magnetic field application layers 6 is in the direction indicated by the reference number 6a. It is assumed that the applied magnetic field 6a rotates the magnetization 39a of the oblique pinned layer 39 clockwise toward the 90-degree direction (Y-axis).

The language "the angle $\theta_0$=30 to 60 degrees measured on the acute angle basis" is used in the present invention in consideration of the fact that, among the four quadrants defined by the X-axis and Y-axis in FIG. 5, the magnetization 39a of the oblique pinned layer 39 may be present not only in the first quadrant but also in the second quadrant where X is negative and Y is positive. When the magnetization 39b of the oblique pinned layer 39 is present in the second quadrant, the angle $\theta_0'$ in the present invention is measured on the acute angle basis with respect to the X-axis as the reference and the angle $\theta_0'$ falls within a range from 30 to 60 degrees. When the magnetization 39b of the oblique pinned layer 39 is present in the second quadrant, the bias magnetic field applied by the bias magnetic field application layers 6 is in the direction indicated by the reference number 6b. It is assumed that the applied magnetic field 6b rotates the magnetization 39b of the oblique pinned layer 39 counterclockwise toward the 90-degree direction (Y-axis).

The reason that the magnetization direction of the oblique pinned layer 39 is at an angle $\theta_0=\theta_0'$=30 to 60 degrees (preferably 40 to 50 degrees) measured on the acute angle basis is as follows (an explanation will be made regarding only the angle $\theta_0$ on behalf of $\theta_0$ and $\theta_0'$ in order to avoid duplicated descriptions).

When the angle $\theta_0$ is smaller than 30 degrees, sufficient shielding is obtained. However, it is difficult to rotate the magnetization direction of the oblique pinned layer 39 until the direction reaches the same direction as that of the magnetic pinned layer 30 via the magnetic coupling adjustment layer 300. Further, it is also difficult that the magnetization direction is subsequently oriented in the 90-degree direction (Y-axis direction) because the magnetization direction of the oblique pinned layer 39 has to rotate by a large amount. In order to realize the structure, the magnetic coupling adjustment layer 300 should have a large laminate thickness, causing problems such as difficulty in realizing smaller shield gaps. In addition, an intensity of the bias magnetic field from the bias magnetic field application layers 6 should be increased more than necessary, creating undesirable results such as deteriorated sensitivity.

On the other hand, when the angle $\theta_0$ exceeds 60 degrees, undesirably, the intrinsic shielding capability will not be sufficiently exhibited.

Main Shield Layer 37

The main shield layer 37 functions as the mother body for magnetic shielding and has a large thickness of approximately 0.5 to 2.0 μm as described above.

The main shield layer 37 is made of a soft magnetic material, such as NiFe or CoFe, having a high magnetic permeability and high magnetic shield capability.

Magnetic Coupling Adjustment Layer 300

The magnetic coupling adjustment layer 300 is interposed between the oblique pinned layer 39 and magnetic pinned layer 30.

The magnetic coupling adjustment layer 300 is composed of a laminated structure consisting of an exchange-coupling transmitting layer made of at least one material selected from the group consisting of Ru, Rh, Ir, Cr, Cu, Ag, Au, Pt, and Pd, and a gap adjustment magnetic layer composed of a ferromagnetic body. Desirably, the magnetic coupling adjustment layer 300 has a laminated structure formed by alternately laminating the exchange-coupling transmitting layer and gap adjustment magnetic layer multiple times. It is preferred that each of the multiple exchange-coupling transmitting layers have a different exchange-coupling force. For example, the multiple exchange-coupling transmitting layers are configured such that the exchange-coupling forces are gradually increased from the oblique pinned layer to the magnetic pinned layer.

A more specific preferred embodiment of the magnetic coupling adjustment layer 300 is described hereafter with reference to FIGS. 1 to 3. As the magnetic coupling adjustment layer 300, a first gap adjustment magnetic layer 310, a first exchange-coupling transmitting layer 320, a second gap adjustment magnetic layer 330, a second exchange-coupling transmitting layer 340, a third gap adjustment magnetic layer 350, and a third exchange-coupling transmitting layer 360 are sequentially laminated on the oblique pinned layer 39.

In the shown embodiment, the magnetization 310a of the first gap adjustment magnetic layer 310 composed of a ferromagnetic body is directly affected by an influence of the magnetization 39a of the oblique pinned layer 39 is and has the same magnetization direction.

The magnetization 310a of the first gap adjustment magnetic layer 310 is antiferromagnetically-coupled with the magnetization 330a of the second gap adjustment magnetic layer 330 via the first exchange-coupling transmitting layer 320 made of, for example, Ru (the exchange-coupling force $J_1$).

Magnetization 330a of the second gap adjustment magnetic layer 330 is antiferromagnetically-coupled with the magnetization 350a of the third gap adjustment magnetic layer 350 via the second exchange-coupling transmitting layer 340 made of, for example, Ru (the exchange-coupling force $J_2$).

Magnetization 350a of the third gap adjustment magnetic layer 350 is antiferromagnetically-coupled with the magnetization 30a of the magnetic pinned layer 30 functioning as a part of the sensor via the third exchange-coupling transmitting layer 360 made of, for example, Ru (the exchange-coupling force $J_3$).

In this embodiment, the antiferromagnetic coupling in which the magnetization directions are opposite (anti-parallel) and coupled is shown. The ferromagnetic coupling in which the magnetization directions are parallel and coupled can be realized by changing the material and thickness of the exchange-coupling transmitting layers.

In this way, the magnetization 39a of the oblique pinned layer 39 is magnetically linked up to the magnetization 30a of the magnetic pinned layer 30 via the magnetic coupling adjustment layer 300 consisting of a multilayer film.

By adjusting the exchange-coupling forces $J_1$, $J_2$, and $J_3$, the magnetization direction 39a of the oblique pinned layer 39 is gradually rotated until it is oriented in the longitudinal direction axis (Y-axis) direction by the assistance of the width direction vertical bias magnetic field 6a from the bias magnetic field application layers 6 in an internal area of the magnetic coupling adjustment layer 300 (from the oblique pinned layer 39 to the magnetic pinned layer 30). For example, as confirmed in the experimental embodiment described later, the magnetization 39a of the oblique pinned layer 39 is set to an angle of 45 degrees and, when it reaches the magnetic pinned layer 30 via the magnetic coupling adjustment layer 300, the magnetization of the magnetic pinned layer 30 is pinned at an angle of 90 degrees.

Exchange-coupling forces $J_1$, $J_2$, and $J_3$ can be adjusted, for example, by changing a thickness of Ru as appropriate where the first, second, and third exchange-coupling transmitting layers 320, 340, and 360 are made of Ru.

It is also preferable to use a laminate of two different materials for adjusting the exchange-coupling force. More specifically, although a layer of Ru by itself having a thickness of 0.8 nm yields a relatively high level of antiferromagnetic coupling, a combination of a layer of Ru having a thickness of 0.8 nm and a layer of Cu, Ag, or Au having a thickness of 0.1 to 0.3 nm can preferably be used to adjust the exchange-coupling force for a reduced level.

Furthermore, the materials of the first, second, and third exchange-coupling transmitting layers 320, 340, and 360 can be selected as appropriate so that they are made of different materials.

Specific rotation behavior of the magnetization is described hereafter with reference to FIGS. 3 and 4. Namely, the rotation behavior means how the magnetization 39a of the oblique pinned layer 39 rotates up to the magnetization 30a of the magnetic pinned layer 30 via the magnetic coupling adjustment layer 300 consisting of the above multilayer film In this embodiment, the first exchange-coupling transmitting layer 320 consists of a Ru (0.8 nm in thickness)/Cu (0.2 nm in thickness) double-layer laminated body, the second exchange-coupling transmitting layer 340 consists of a Ru (0.8 nm in thickness)/Cu (0.1 nm in thickness) double-layer laminated body, and the third exchange-coupling transmitting layer 360 consists of a Ru (0.8 nm in thickness) layer so that the following relationship is obtained: the exchange-coupling force $J_1$<the exchange-coupling force $J_2$<the exchange-coupling force $J_3$. The behavior is described below:

(1) As shown in FIGS. 3 and 4, the magnetization 310a of the first gap adjustment magnetic layer 310 made of a ferromagnetic material directly receives the influence of the magnetization 39a of the oblique pinned layer 39 and the two layers have the same magnetization direction.

(2) As shown in FIGS. 3 and 4, the magnetization 310a of the first gap adjustment magnetic layer 310 and the magnetization 330a of the second gap adjustment magnetic layer 330 are antiferromagnetically-coupled. However, because of the smaller exchange-coupling force $J_1$, the magnetization 310a is easier to move and rotates by an angle $\theta_1$ (see FIG. 4) under the influence of the bias magnetic field 6a from the bias magnetic field application layers 6, yielding a state of the magnetization 330a.

(3) As shown in FIGS. 3 and 4, the magnetization 330a of the second gap adjustment magnetic layer 330 and the magnetization 350a of the third gap adjustment magnetic layer 350 are antiferromagnetically-coupled. However, because of the relatively small exchange-coupling force $J_2$, the magnetization 330a rotates by an angle $\theta_2$ (see FIG. 4) under the influence of the bias magnetic field 6a from the bias magnetic field application layers 6, yielding a state of the magnetization 350a. In this point of this embodiment, the magnetization 350a is substantially oriented in the 90-degree or Y-axis direction.

(4) The magnetization 350a of the third gap adjustment magnetic layer 350 and the magnetization 30a of the magnetic pinned layer 30 are antiferromagnetically-coupled. The magnetizations are opposite, and the magnetization 30a is substantially oriented in the 90-degree or negative Y axis direction (see FIG. 4).

It is seen in FIG. 4 that the initial magnetization direction 50a of the free layer 50 shown for reference is in the negative X direction, and the magnetization 30a of the magnetic pinned layer 30 and the initial magnetization 50a of the free layer 50 are perpendicular to each other.

Explanation of Second Shield Layer 5, Insulating Layer 4, and Bias Magnetic Field Application Layers 6

The second shield layer 5 is provided so as to be closer to the free layer 50 than to the magnetic pinned layer 30; namely, it is provided at the upper part (also referred to as "the upper shield layer 5") as shown in FIG. 1. The second shield layer 5 is made of a soft magnetic material, such as NiFe and CoFe, having a high magnetic permeability and high magnetic shield capability. The second shield layer 5 has a thickness of approximately 0.5 to 2.0 μm.

The insulating layer 4 shown in FIG. 1 can be made of, for example, alumina.

The bias magnetic field application layers 6 can be, for example, a laminated layer consisting of a hard magnetic layer or consisting of a ferromagnetic layer and an antiferromagnetic layer. Specifically, CoPt or CoCrPt can be used, for example. The width direction of the vertical bias magnetic field from the bias magnetic field application layers 6 is determined so that the magnetization of the oblique pinned layer 39 is oriented toward the 90-degree direction as described above.

[Explanation of the Overall Structure of a Thin Film Magnetic Head]

Figure 6:
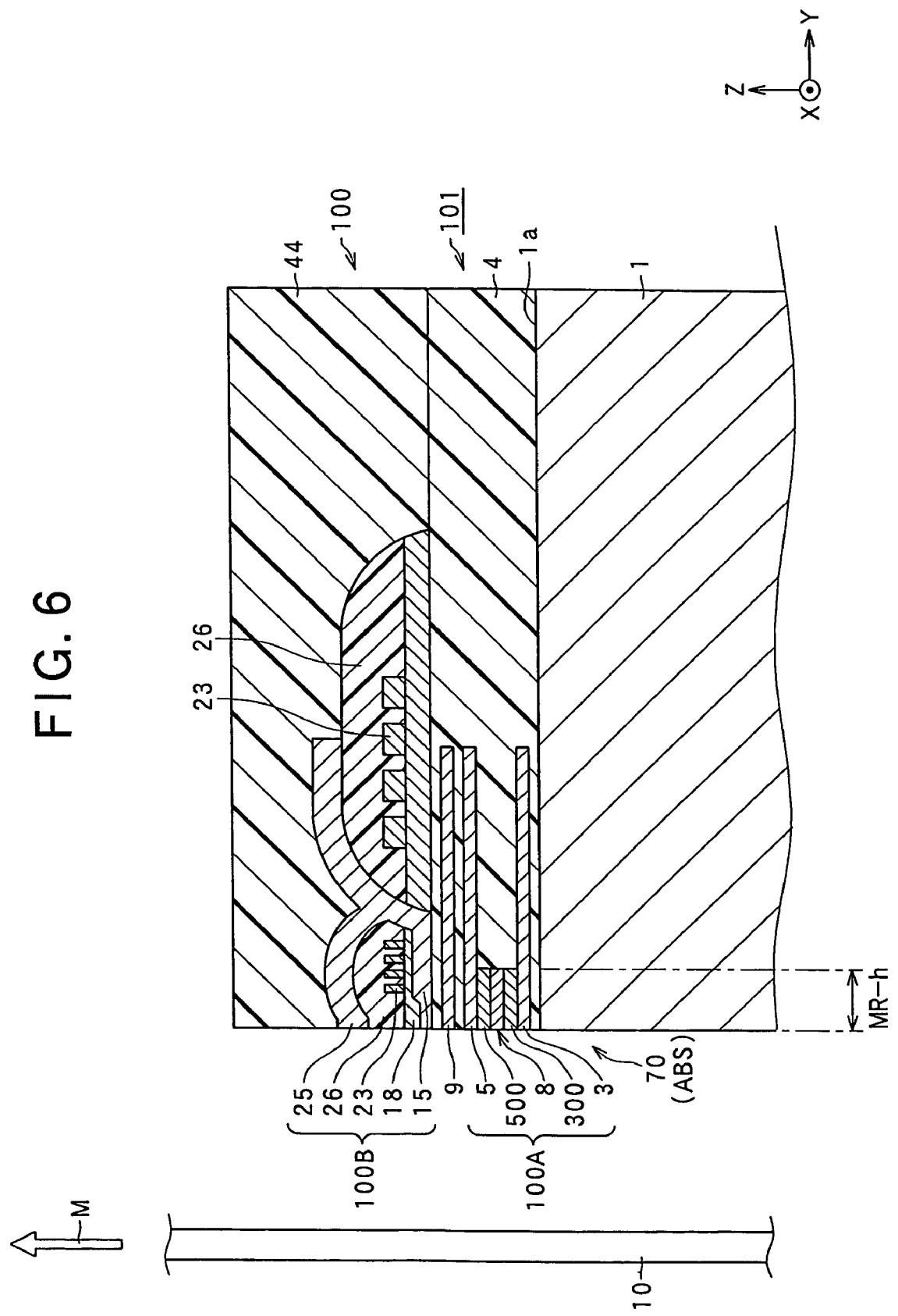
FIG. 6 is across-sectional view of a thin film magnetic head in a Y-Z plan for explaining the structure of the thin film magnetic head according to a preferred embodiment of the present invention.

FIG. 6 shows a sectional view (i.e., a cross section taken along the Y-Z plane) of a thin film magnetic head parallel to the so-called ABS.

A thin film magnetic head 100 as shown in FIG. 6 is mounted on a magnetic recording device such as a hard disk drive in order to magnetically process a recording medium 10 such as a hard disk that moves in the medium traveling direction M.

The thin film magnetic head 100 as exemplified in the drawing is a so-called complex type head that is executable for both recording processing and reproducing processing as magnetic processing. As shown in FIG. 6, it has a structure of a magnetic head 101 formed on a slider substrate 1 made of a ceramic material such as AlTic ($Al_2O_3$.TiC).

A magnetic head 101 has a laminated structure of a reproducing head 100A for reproducing magnetic information recorded using the magnetoresistive effect and, for example, a shield type recording head 100B for executing the recording processing of the perpendicular recording system.

The description below provides greater detail.

The first shield layer 3 and the second shield layer 5 are flat layers formed in a manner of being substantially parallel to the side surface 1a of the slider substrate 1. These layers 3 and 5 form part of the ABS 70 that is the medium opposed surface.

A magnetoresistive effect (MR) part 8 is disposed in a manner in which it is sandwiched between the first shield layer 3 and the second shield layer 5 and forms part of the ABS 70. A height perpendicular to the ABS 70 (i.e., in the Y direction) is an MR height (MR-h).

The first shield layer 3 and the second shield layer 5 are formed by a pattern plating method including a frame plating method, for example. Although it is not clearly shown in the drawing, the first shield layer 3 should be structured in such a way as to demonstrate the above-mentioned effect of the present invention.

The MR part 8 is a laminated film substantially parallel to the side surface 1*a* of the slider substrate 1, and forms a part of the ABS 70.

The MR part 8 is a film surface perpendicular type (CPP) laminated film in which a sense current flows in the direction perpendicular to the laminating surface and has the structure described above.

Moreover, as shown in FIG. 6, an interelement shield layer 9 made of the same material as that of the second shield layer 5 is formed between the second shield layer 5 and the recording head 100B.

The interelement shield layer 9 functions in a manner of shielding the MR part 8 that functions as a sensor from a magnetic field generated by the recording head 100B, thereby blocking exogenous noises at the time of reading. A bucking coil may also be formed between the interelement shield layer 9 and the recording head 100B. The bucking coil generates magnetic flux that overrides a magnetic flux loop generated by the recording head 100B and passes through the upper and lower electrode layers of the MR part 8 and, therefore, suppresses unnecessary writing to a magnetic disk or wide area adjacent tracks erasing (WATE) phenomena that erase operations.

Insulating layers 4 and 44 made of alumina, etc. are formed in the gap between the first shield layer 3 and the second shield layer 5 on the side opposite to the ABS 70 of the MR part 8; in the rear region between the first and second shield layers 3 and 5 and the interelement shield layer 9 on the side opposite to the ABS 70; in the gap between the first shield layer 3 and the slider substrate 1; and in the gap between the interelement shield layer 9 and the recording head 100B.

The recording head 100B is preferably structured for perpendicular magnetic recording and, as shown in FIG. 6, has a main magnetic pole layer 15, a gap layer 18, a coil insulating layer 26, a coil layer 23 and an auxiliary magnetic pole layer 25.

The main magnetic pole layer 15 is structured as a leading magnetic path for leading and focusing magnetic flux initiated by the coil layer 23 to the recording layer of a magnetic recording medium 10 to be written. It is preferred that the end part of the main magnetic pole layer 15 on the side of the ABS 70 should be smaller in thickness compared with other portions in the track width direction (i.e., the direction along the X-axis in FIG. 6) and in the laminating direction (i.e., the direction along the Z-axis in FIG. 6). As a result, it is possible to generate a magnetic field for minute and strong writing corresponding to high recording density.

On the end part of the auxiliary magnetic pole layer 25 magnetically coupled with the main magnetic pole layer 15 on the side of the ABS 70 is formed a trailing shield that has a wider layer cross section than the other portions of the auxiliary magnetic layer 25. As shown in FIG. 6, the auxiliary magnetic pole layer 25 is disposed in a manner of being opposed to the end part of the main magnetic pole layer 15 on the side of the ABS 70 via the gap layer made of insulating material such as alumina and the coil insulating layer 26.

The provision of the auxiliary magnetic pole layer 25 allows making the magnetic field gradient steep between the auxiliary magnetic pole layer 25 and the main magnetic pole layer 15 in the vicinity of the ABS 70. As a result, signal output jitter is reduced, making the error rate smaller at the time of reading.

The auxiliary magnetic pole layer 25 is formed, for example, to have about 0.5 to 5 μm in thickness by a frame plating method, a sputtering method or the like. Employed material may be an alloy made of two or three element selected from the group consisting of Ni, Fe and Co, for example, or an alloy made of these elements, as main components, added with predetermined chemical elements.

The gap layer 18 is formed to separate the coil layer 23 from the main magnetic pole layer 15. The gap layer 18 may be formed by a sputtering method, a CVD method or the like, for example, have a thickness of about 0.01 to 0.5 μm and be structured of $Al_2O_3$, diamond-like carbon (DLC) or the like.

[Explanation of Effect of the Thin Film Magnetic Head]

The thin film magnetic head records information on a recording medium by means of the recording head and reproduces information recorded on a recording medium by means of the reproducing head. The thin film magnetic head according to this embodiment, particularly the reproducing head containing the MR element will be described.

In the reproducing head, the bias magnetic field 6*a* from the bias magnetic field application layers 6 is oriented in the X-axis direction that is perpendicular to a direction (Y-direction) perpendicular to the ABS 70. It can be either in the negative X direction or in the positive X direction. However, it is necessary that the bias magnetic field 6*a* is oriented in a direction in which the specific effect of the invention of the present application is realized (see FIG. 5).

In the CPP-GMR element, the direction of the magnetization 50*a* of the free layer 50 is aligned with the bias magnetic field (in the X-axis direction) in the absence of signal magnetic field. The magnetization 30*a* of the magnetic pinned layer 30 is pinned in a direction perpendicular to the ABS (in the Y-axis direction).

In the CPP-GMR element, the direction of the magnetization 50*a* of the free layer 50 varies (or rotates) in accordance with the signal magnetic field from the recording medium. Then, the relative angle between the magnetization direction of the free layer 50 and the direction of the magnetization 30*a* of the magnetic pinned layer 30 also changes, changing the resistance value of the CPP-GMR element. The resistance value of the CPP-GMR element can be obtained based on a potential difference between the two electrode layers 3 and 5 when a sense current is applied through the MR element by means of the first and second shield layers 3 and 5. In this way, the reproducing head can reproduce information recorded on a recording medium.

[Explanation of the Head Gimbal Assembly and Hard Disk Device]

The head gimbal assembly in which the above described thin film magnetic head is installed for use and a hard disk device will be described hereafter.

Figure 7:
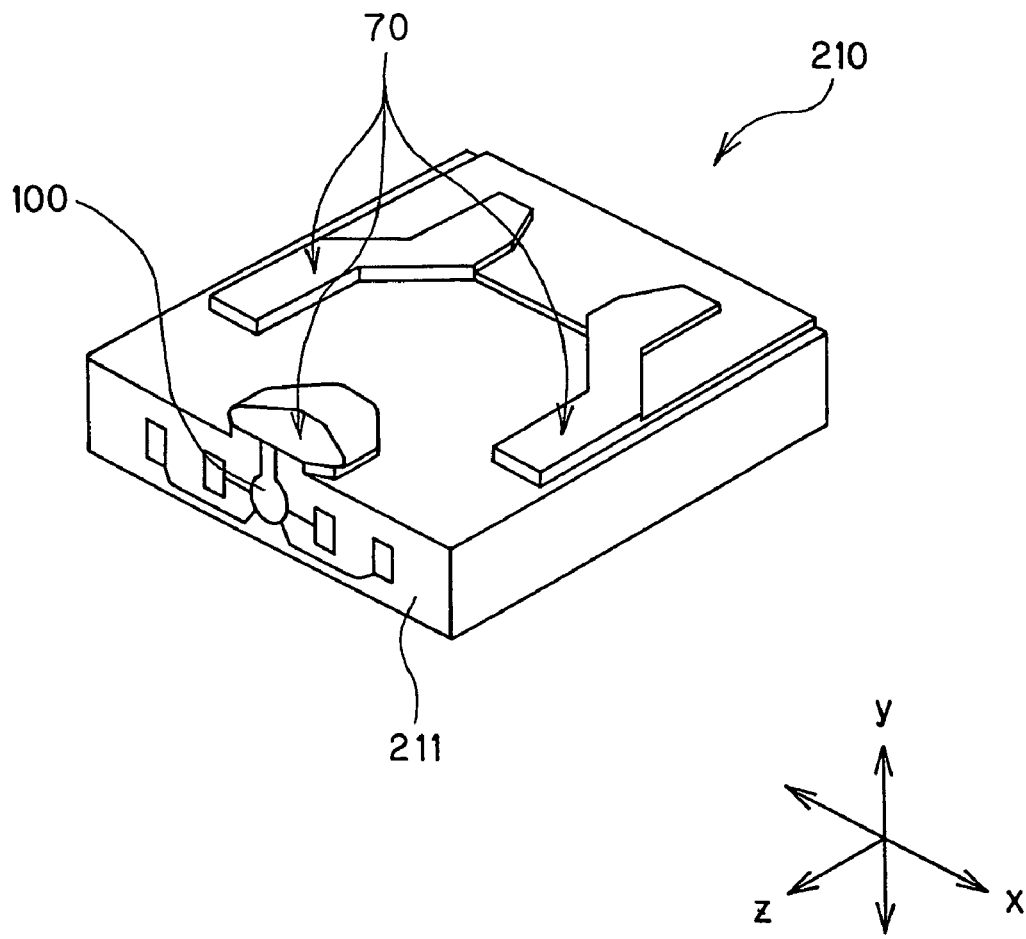
FIG. 7 is a perspective view showing a slider included in the head gimbal assembly according to an embodiment of the present invention.

A slider 210 contained in the head gimbal assembly is described hereafter with reference to FIG. 7. In a hard disk device, a slider 210 is so provided as to face the hard disk that is a rotatable cylindrical recording medium. The slider 210 primarily comprises a base 211 consisting of a substrate and an overcoat.

The base 211 has a nearly hexahedral shape. One of the six surfaces of the base 211 faces the hard disk. The ABS 70 is formed on this surface.

When the hard disk is rotated in the z-direction in FIG. 7, the airflow passing through between the hard disk and slider 210 provides aerodynamic lift to the slider 210 beneath it in the y-direction in FIG. 7. Because of the aerodynamic lift, the slider 210 is lifted up from the surface of the hard disk. Here, the x-direction in FIG. 7 is the track traversing direction of the hard disk.

The thin film magnetic head according to this embodiment is provided near the end of the air exit of the slider 210 (the bottom left end in FIG. 7).

Figure 8:
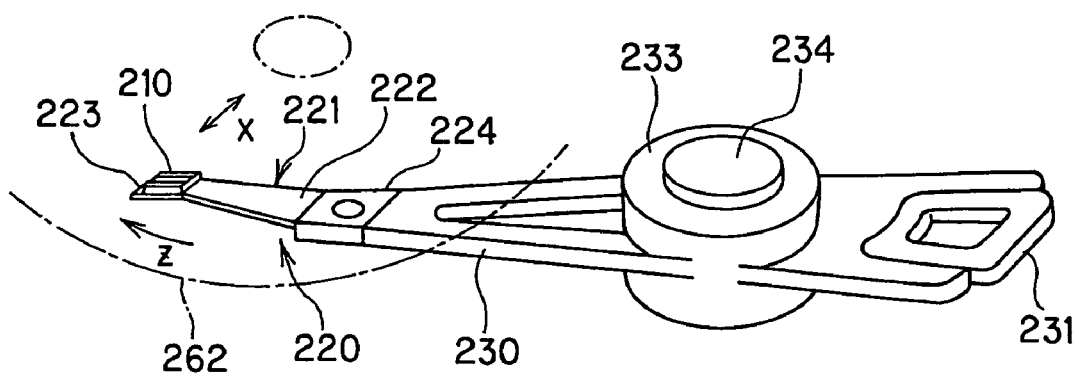
FIG. 8 is a perspective view showing a head arm assembly including the head gimbal assembly according to an embodiment of the present invention.

A head gimbal assembly 220 according to this embodiment is described hereafter with reference to FIG. 8. A head gimbal assembly 220 comprises a slider 210 and a suspension 221 elastically supporting the slider 210. The suspension 221 has a load beam 222 in the form of a plate spring formed by, for example, stainless steel, a flexure 223 provided at one end of the load beam 222 and to which the slider 210 is joined for giving an appropriate degree of freedom to the slider 210, and a base plate 224 provided at the other end of the load beam 222.

The base plate 224 is to be attached to the arm 230 of an actuator for moving the slider 210 in the track traversing direction x of a hard disk 262. The actuator has an arm 230 and a voice coil motor driving the arm 230. A gimbal part for keeping the slider 210 in a fixed orientation is provided at the part of the flexure 223 to which the slider 210 is attached.

The head gimbal assembly 220 is mounted on the arm 230 of an actuator. A single arm 230 on which the head gimbal assembly 220 is mounted is called a head arm assembly. Multiple arms of a carriage on each of which the head gimbal assembly 220 is mounted are called a head stack assembly.

FIG. 8 illustrates a head arm assembly. In the head arm assembly, the head gimbal assembly 220 is mounted on one end of the arm 230. A coil 231 as a part of a voice coil motor is mounted on the other end of the arm 230. The arm 230 has a bearing part 223 in the middle part, which is mounted on a shaft 234 for rotatably supporting the arm 230.

Figure 9:
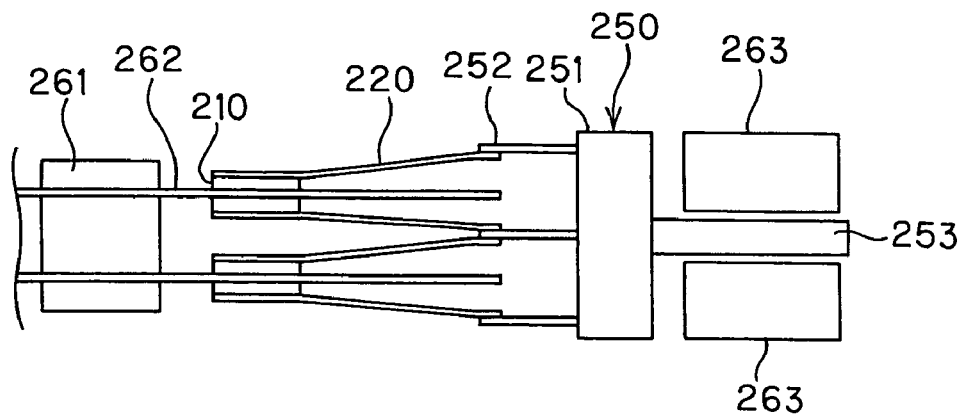
FIG. 9 is an illustration for explaining primary parts of the magnetic disk device according to an embodiment of the present invention.
Figure 10:
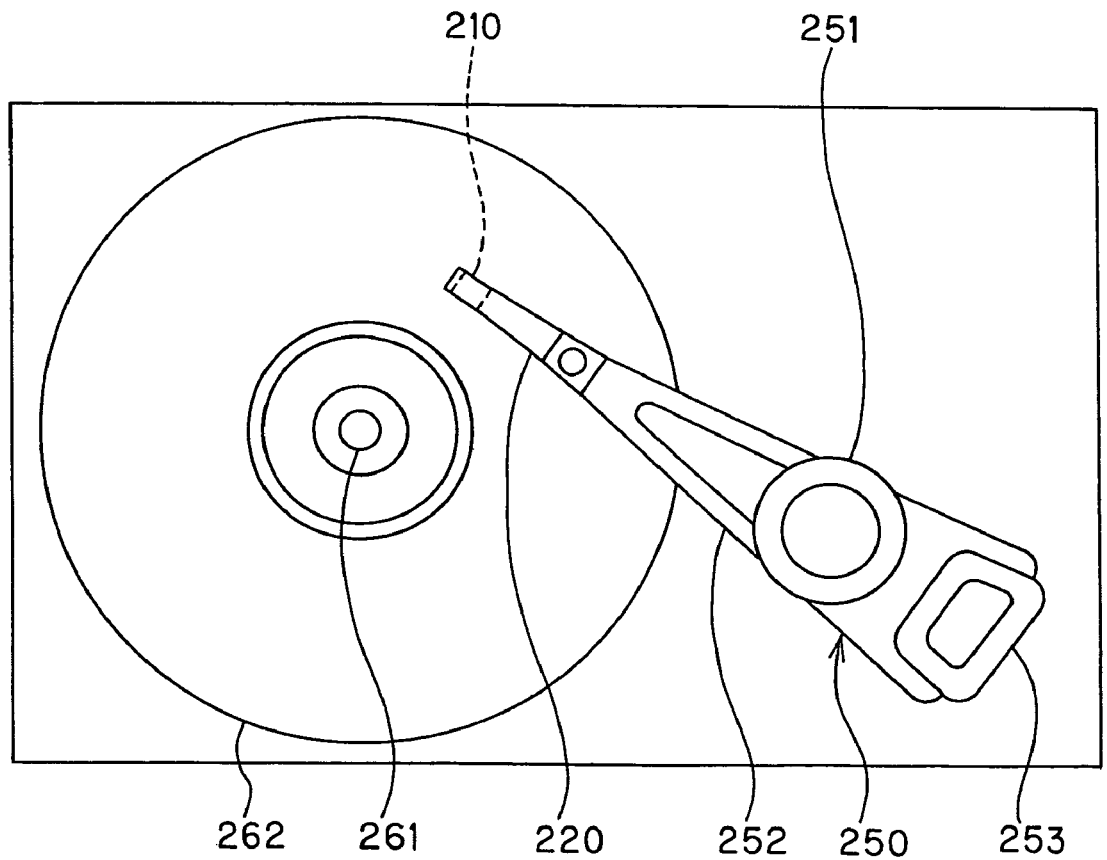
FIG. 10 is a plane view of the magnetic disk device according to an embodiment of the present invention.

An embodiment of the head stack assembly and a hard disk device according to this embodiment is described hereafter with reference to FIGS. 9 and 10.

FIG. 9 is an illustration for explaining the primary part of a hard disk device and FIG. 10 is a plan view of a hard disk device.

A head stack assembly 250 has a carriage 251 having multiple arms 252. Multiple head gimbal assemblies 220 are mounted on the multiple arms 252 so that they are spaced from each other in the vertical direction. The carriage 251 has a coil 253 as a part of a voice coil motor on the opposite side to the arms 252. The head stack assembly 250 is installed in a hard drive device.

A hard drive desk device has multiple hard disks 262 attached to a spindle motor 261. Two sliders 210 are provided to each hard disk 262, facing each other with the hard disk 262 in between. The voice coil motor has permanent magnets 263 facing each other with the coil 253 of the head stack assembly 250 in between.

The head stack assembly 250 excluding the sliders 210 and the actuator correspond to the positioning device of the present invention, supporting and positioning the slider 210 in relation to the hard disk 262.

In the hard disk device according to this embodiment, the actuator moves the slider 210 in the track traversing direction of the hard disk 262 and positions the slider 210 in relation to the hard disk 262. The thin film magnetic head contained in the slider 210 records information on the hard disk 262 by means of the recording head and reproduces information recorded on the hard disk 262 by means of the reproducing head.

The head gimbal assembly and hard disk device according to this embodiment yields the same effect as the thin film magnetic head according to the described embodiment.

In this embodiment, the thin film magnetic head having the reproducing head formed on the base and the perpendicular recording head laminated on the reproducing head is described. The order of lamination can be reversed. For use as a reproducing-only thin film head, only the reproducing head can be provided.

The type of recording head is not restricted in any way. However, it is desirably a perpendicular magnetic recording head.

EXPLANATION OF SPECIFIC EXPERIMENTAL EMBODIMENTS

The above described invention of thin film magnetic head will be described in further detail in the following specific experimental embodiments.

Experimental Embodiment 1

A CPP-GMR element sample of the present invention having the laminated structure shown in Table 1 below was made.

With exchange-coupling with the ferromagnetic layer 38, a magnetization of the oblique pinned layer 39 in Table 1 was pinned at an angle of 45 degrees measured on the acute angle basis with respect to the width direction axis (X-axis) as the reference (0 degrees) in a plane defined by the width direction axis (X-axis) and longitudinal direction axis (Y-axis) of the ABS.

The oblique pinned layer 39 was pinned by annealing it at 250° C. for five hours while applying an 8 kOe magnetic field at an angle of 45 degrees from the ABS.

Here, the magnetic coupling forces from the first, second, and third exchange-coupling transmitting layers 320, 340, and 360 of the magnetic coupling adjustment layer 300 in Table 1 were designed to be increased in strength from the lower shield layer 3 to the magnetic pinned layer 30. More specifically, the coupling force $J_1$ by the first exchange-coupling transmitting layer 320 was approximately 0.3 erg/cm$^2$; the coupling force $J_2$ by the second exchange-coupling transmitting layer 340 was approximately 0.6 erg/cm$^2$; and the third force $J_3$ by the third exchange-coupling transmitting layer 360 was approximately 0.9 erg/cm$^2$.

The bias magnetic field application layers 6 were made of CoPt (not shown in Table 1) and the magnetic field intensity applied by the bias magnetic field application layers 6 was approximately 500 Oe.

TABLE 1

| Laminated structure | Layer material | Thickness (nm) |
|---|---|---|
| 2nd shield layer (5) (upper shield layer (5)) | NiFe | 1,000 |
| Passivation layer (20) (cap layer (20)) | Ru | 8.0 |
| Free layer (50) | NiFe | 4.0 |
| | CoFeB | 0.5 |
| | CoFe | 0.5 |
| Nonmagnetic intermediate layer (40) | MgO | 1.5 |
| Magnetic pinned layer (30) | CoFe | 1.0 |
| | CoFeB | 2.0 |

TABLE 1-continued

|  | Laminated structure | Layer material | Thickness (nm) |
|---|---|---|---|
| Magnetic coupling adjustment layer (300) | 3rd exchange-coupling transmitting layer (360) | Ru | 0.8 |
|  | 3rd gap adjustment magnetic layer (350) | CoFe | 1.0 |
|  | 2nd exchange-coupling transmitting layer (340) | Cu | 0.1 |
|  |  | Ru | 0.8 |
|  | 2nd gap adjustment magnetic layer (330) | CoFe | 1.0 |
|  | 1st exchange-coupling transmitting layer (320) | Cu | 0.2 |
|  |  | Ru | 0.8 |
|  | 1st gap adjustment magnetic layer (310) | CoFe | 1.0 |
| 1st shield layer (3) (lower shield layer (3)) | Oblique pinned layer (39) | CoFe | 5.0 |
|  | Antiferromagnetic layer (38) | IrMn | 6.0 |
|  | Main shield layer (37) | NiFe | 1,000 |

The magnetoresistive effect of the sample of the invention of the present application formed as described above was used to detect a −400 Oe to 400 Oe signal magnetic field from a medium and the magnetic resistance change acceptable for practical use was confirmed. Furthermore, it was also confirmed that no pinned layer had the magnetization reversed (no pin-reversed element).

The intershield gap of the structure shown in FIG. 1 was 22.2 nm and approximately 26% smaller than the intershield gap, approximately 30 nm, of the prior art conventional spin valve type GMR element.

From the above results, the effect of the present invention is obvious. More specifically, the MR element of the present invention is an MR element of a CPP structure having an MR part (having a multilayer film formed by sequentially laminating a magnetic pinned layer, a nonmagnetic intermediate layer, and a free layer), bias magnetic field application layers formed on either end of the multilayer film in the width direction, and first and second shield layers so provided as to interpose the magnetoresistive effect between them from above and below, wherein a sense current is applied in the lamination direction. The free layer is configured to change its magnetization direction in accordance with the external magnetic field. The bias magnetic field application layers are configured to apply a vertical bias magnetic field in a width direction to the free layer and to extend backward from an air bearing surface (ABS) that is the medium opposed surface.

The first shield layer is provided closer to the magnetic pinned layer than to the free layer, and has a laminated structure composing of, from the magnetic pinned layer side, an oblique pinned layer, an antiferromagnetic layer, and a main shield layer. A magnetic coupling adjustment layer is interposed between the oblique pinned layer of the first shield layer and the magnetic pinned layer. A magnetization of the oblique pinned layer is pinned by an exchange-coupling with the antiferromagnetic layer at an angle of 30 to 60 degrees measured on the acute angle basis with respect to a width direction axis (X-axis) as the reference (0 degree) in a plane defined by the width direction axis (X-axis) and a longitudinal direction axis (Y-axis) of the ABS. The magnetization of the oblique pinned layer is magnetically linked to a magnetization of the magnetic pinned layer via the magnetic coupling adjustment layer. And the magnetization direction of the oblique pinned layer is magnetically coupled in the magnetic coupling adjustment layer that is from the oblique pinned layer to the magnetic pinned layer so that the magnetization direction is gradually oriented toward the longitudinal direction axis (Y-axis) by the assistance of the vertical bias magnetic field in the width direction from the bias magnetic field application layers. With the configuration, the pin reversal of the pinned layer can be reduced as much as possible even if the tracks are made narrower and the read gaps can further be made narrower.

In regard to the industrial applicability of the present invention, the present invention has applications in the field of magnetic disk devices comprising a magnetoresistive effect element for reading the magnetic field intensity of magnetic recording media etc. as signals.

What is claimed is:

1. A magnetoresistive effect (MR) element of a current perpendicular to plane (CPP) structure comprising:
a magnetoresistive effect (MR) part that includes a multilayer film formed of sequentially a magnetic pinned layer, a nonmagnetic intermediate layer, and a free layer;
bias magnetic field application layers formed on either end of the multilayer film in a width direction along a width direction axis (X-axis); and
first and second shield layers provided so as to interpose the MR part between them from above and below, wherein
a sense current is applied in a direction along a lamination direction axis (Z-axis);
the free layer is configured to change its magnetization direction in accordance with the external magnetic field;
the bias magnetic field application layers are configured to apply a vertical bias magnetic field in the width direction to the free layer and to extend backwardly from an air bearing surface (ABS) that is the medium opposed surface;
the first shield layer is provided closer to the magnetic pinned layer than to the free layer, and has a laminated structure comprising, from the magnetic pinned layer side, an oblique pinned layer, an antiferromagnetic layer, and a main shield layer;
a magnetic coupling adjustment layer is interposed between the oblique pinned layer of the first shield layer and the magnetic pinned layer;
a magnetization of the oblique pinned layer is pinned by an exchange-coupling with the antiferromagnetic layer at an angle of 30 to 60 degrees measured on an acute angle basis with respect to the width direction axis (X-axis) as the reference (0 degree) in a plane defined by the width direction axis (X-axis) and a longitudinal direction axis (Y-axis) of the ABS;
the magnetization of the oblique pinned layer is magnetically linked up to a magnetization of the magnetic pinned layer via the magnetic coupling adjustment layer;
the magnetization direction of a magnetic layer positioned closest to the magnetic pinned layer among magnetic layers existing in the magnetic coupling adjustment layer is toward the longitudinal direction axis (Y-axis) by the assistance of the vertical bias magnetic field in the width direction from the bias magnetic field application layers; and the magnetization direction of the magnetic layer forms an acute angle greater than 0 degrees with respect to the width direction axis (X-axis).

2. The MR element of claim 1 wherein
the magnetization of the magnetic pinned layer is pinned at an angle of 90±10 degrees with respect to the width direction axis (X-axis) as the reference (0 degree) in a plane defined by the width direction axis (X-axis) and the longitudinal direction axis (Y-axis) of the ABS.

3. A thin film magnetic head comprising:
an air bearing surface that faces a recording medium; and
the MR element of claim 1 provided near the ABS to detect a signal magnetic field from the recording medium.

4. A head gimbal assembly comprising:
a slider containing the thin film magnetic head of claim 3 and so provided as to face a recording medium; and
a suspension elastically supporting the slider.

5. A magnetic disk device comprising:
a slider containing the thin film magnetic head of claim 3 and so provided as to face a recording medium; and
a positioning device supporting and positioning the slider in relation to the recording medium.

6. The MR element of claim 1, wherein
the magnetic coupling adjustment layer contains a laminated structure comprising an exchange-coupling transmitting layer composed of at least one material selected from a group consisting of Ru, Rh, Ir, Cr, Cu, Ag, Au, Pt, and Pd, and a gap adjustment magnetic layer composed of a ferromagnetic body,
the magnetization direction of the gap adjustment magnetic layer positioned closest to the magnetic pinned layer in the magnetic coupling adjustment layer is toward the longitudinal direction axis (Y-axis) by the assistance of the vertical bias magnetic field in the width direction from the bias magnetic field application layers; and
the magnetization direction of the gap adjustment magnetic layer forms an acute angle greater than 0 degrees with respect to the width direction axis (X-axis).

7. The MR element of claim 6 wherein
a direction of the vertical bias magnetic field in the width direction from the bias magnetic field application layers is determined so that the magnetization of the gap adjustment magnetic layer positioned closest to the magnetic pinned layer is oriented in the 90-degree direction with respect to the width direction axis (X-axis).

8. The MR element of claim 6, wherein
the magnetic coupling adjustment layer has a laminated structure formed by alternately laminating the exchange-coupling transmitting layer multiple times, and
the gap adjustment magnetic layer and the multiple exchange-coupling transmitting layers have different exchange-coupling forces.

9. The MR element of claim 6, wherein
the magnetic coupling adjustment layer has a laminated structure formed by alternately laminating the exchange-coupling transmitting layer and the gap adjustment magnetic layer multiple times, and
an exchange-coupling force in each of the multiple exchange-coupling transmitting layers is sequentially increased in an order from the oblique pinned layer to the magnetic pinned layer.

10. The MR element of claim 9, wherein at least one of the exchange-coupling transmitting layers is a double-layer laminated body composed of a Ru layer and a Cu layer, and
an exchange-coupling force of the exchange-coupling transmitting layer is adjustable in correspondence with a thickness of the Cu layer.

11. A magnetoresistive effect (MR) element of a current perpendicular to plane (CPP) structure, comprising:
a magnetoresistive effect (MR) part that includes a multilayer film formed of sequentially a magnetic pinned layer, a nonmagnetic intermediate layer, and a free layer;
bias magnetic field application layers formed on either end of the multilayer film in a width direction axis (X-axis) of an air bearing surface (ABS) to the free layer; and
first and second shield layers provided so as to interpose the MR part between them from above and below, wherein
a magnetization direction of the magnetic pinned layer is in a longitudinal direction axis (Y-axis) of the air bearing surface (ABS) that is transverse to the width direction axis (X-axis),
the bias magnetic field application layers are configured to apply a vertical bias magnetic field in the width direction axis (X-axis) to the free layer,
the first shield layer is provided closer to the magnetic pinned layer than to the free layer, and has a laminated structure including an oblique pinned layer,
the oblique pinned layer has a 30 to 60 degree magnetization direction orientation measured on an acute angle basis with respect to the width direction axis (X-axis) as the reference (0 degree),
a magnetic coupling adjustment layer is interposed between the oblique pinned layer of the first shield layer and the magnetic pinned layer,
a magnetization direction of the magnetic coupling adjustment layer is generally aligned with the magnetization direction of the oblique pinned magnetic layer in a region closest to the oblique pinned magnetic layer,
the magnetization direction of the magnetic coupling adjustment layer is generally aligned with a magnetization direction of the magnetic pinned layer in a region closest to the magnetic pinned layer, and
the magnetization direction of the magnetic coupling adjustment layer is step-wise rotated from the 30 to 60 degree magnetization direction orientation in the region closest to the oblique pinned magnetic layer to the longitudinal direction axis (Y-axis) in the region closest to the magnetic pinned layer.

12. A magnetoresistive effect (MR) element of a current perpendicular to plane (CPP) structure comprising:
a magnetoresistive effect (MR) part that includes a multilayer film formed of sequentially a magnetic pinned layer, a nonmagnetic intermediate layer, and a free layer;
bias magnetic field application layers formed on either end of the multilayer film in a width direction along a width direction axis (X-axis); and
first and second shield layers provided so as to interpose the MR part between them from above and below, wherein
a sense current is applied in a direction along a lamination direction axis (Z-axis);
the free layer is configured to change its magnetization direction in accordance with the external magnetic field;
the bias magnetic field application layers are configured to apply a vertical bias magnetic field in the width direction to the free layer and to extend backwardly from an air bearing surface (ABS) that is the medium opposed surface;

the first shield layer is provided closer to the magnetic pinned layer than to the free layer, and has a laminated structure comprising, from the magnetic pinned layer side, an oblique pinned layer, an antiferromagnetic layer, and a main shield layer;

a magnetic coupling adjustment layer is interposed between the oblique pinned layer of the first shield layer and the magnetic pinned layer and contains a gap adjustment magnetic layer;

a magnetization of the oblique pinned layer is pinned by an exchange-coupling with the antiferromagnetic layer at an angle of 30 to 60 degrees measured on an acute angle basis with respect to the width direction axis (X-axis) as the reference (0 degree) in a plane defined by the width direction axis (X-axis) and a longitudinal direction axis (Y-axis) of the ABS;

the magnetization of the oblique pinned layer is magnetically linked up to a magnetization of the magnetic pinned layer via the magnetic coupling adjustment layer;

the magnetization direction of a magnetic layer positioned closest to the magnetic pinned layer among magnetic layers existing in the magnetic coupling adjustment layer is toward the longitudinal direction axis (Y-axis) by the assistance of the vertical bias magnetic field in the width direction from the bias magnetic field application layers;

the magnetization direction forms an acute angle greater than 0 degrees with respect to the width direction axis (X-axis);

the magnetization of the magnetic pinned layer is pinned at an angle of 90±10 degrees with respect to the width direction axis (X-axis) as the reference (0 degree) in a plane defined by the width direction axis (X-axis) and longitudinal direction axis (Y-axis) of the ABS; and a direction of the vertical bias magnetic field in the width direction from the bias magnetic field application layers is determined so that a magnetization of the gap adjustment magnetic layer positioned closest to the magnetic pinned layer is oriented in the 90-degree direction relative to the width direction axis (X-axis).

* * * * *